Inventors
Fritz-Otto Zeyen, &
Wilfried Pawlowski.
By *[signature]* Atty.

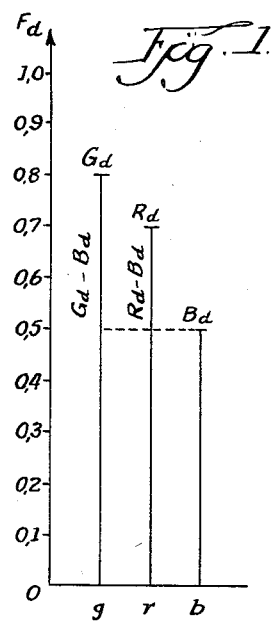
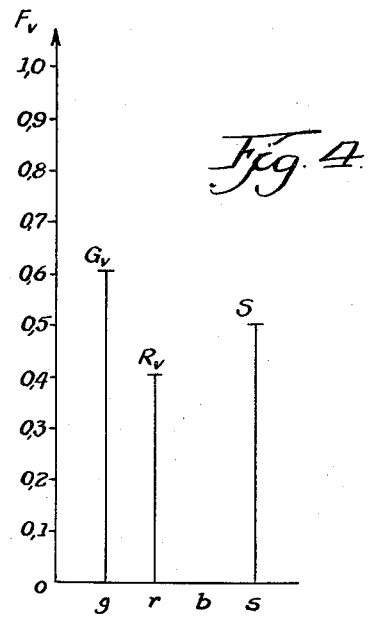
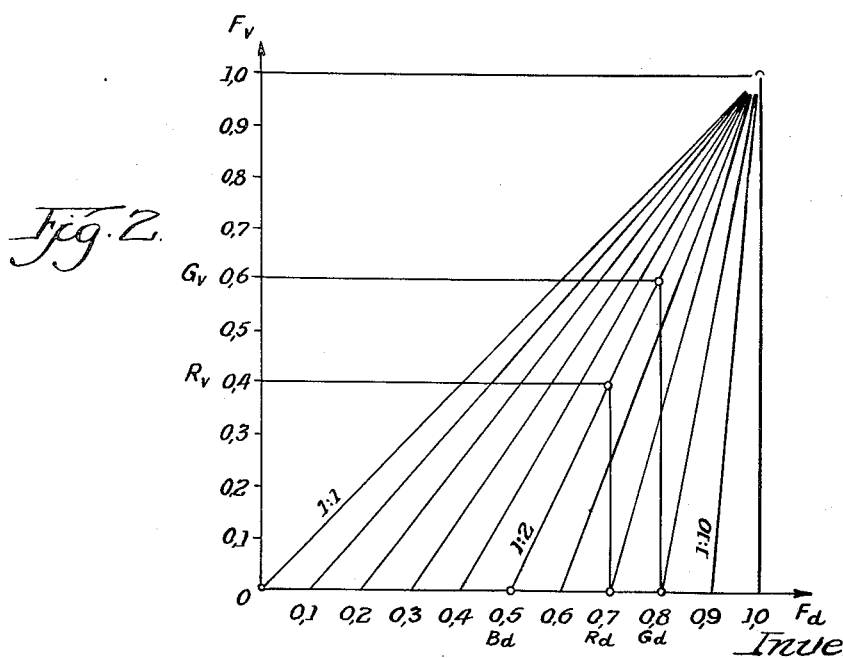
Inventors.
Fritz-Otto Zeyen, &
Wilfried Pawlowski.

United States Patent Office 2,949,499
Patented Aug. 16, 1960

2,949,499

APPARATUS FOR RESOLVING THREE-COLOR SEPARATION INTO FOUR-COLOR SEPARATION

Fritz-Otto Zeyen, Kiel, and Wilfried Pawlowski, Kitzeberg, Germany; said Zeyen assignor to Dr.-Ing. Rudolf Hell Kommanditgesellschaft, Kiel, Germany, a company of Germany Filed Nov. 13, 1956, Ser. No. 627,532

Claims priority, application Germany Nov. 14, 1955

2 Claims. (Cl. 178—5.4)

This invention is concerned with apparatus for resolving three-color separation into four-color separation.

In the reproduction art there are known methods and apparatus for transforming or resolving three existing color separations, for instance a yellow, a red and a blue separation, which have been prepared photographically from colored copy which is to be reproduced, into four color extracts equivalent in their printing result, namely a yellow, red, blue separation and an additional black separation.

The purpose of the additional black separation is that those colors the superimposing of which gives black are saved and that dark colored contours are reproduced more sharply.

In the case of relief printing, the color-mixing laws have been investigated by H. E. J. Neugebauer (Dissertation, Dresden 1935, "Zur Theorie des Mehrfarbendruckes," which also may be found in "Zeitschrift für wissenschaftliche Photographie," volume 36 (1937), pages 73–89), and he arrived at formulas which make it possible to treat mathematically in a precise manner the questions which occur in connection with the mixing of colors.

In accordance with this theory, a three-color separation can be transformed into a four-color separation by determining for each picture point first of all the smallest of the three color components which is used as black component for the production of the black separation, thereupon subtracting this smallest component from the two other components and finally using the two remaining color components for producing two color separations of each of four-color separation. Since the color composition changes in general from one point to the next of the picture, a different one of the three color components will each time be the smallest and therefore the colors of the two residual color components will continuously change.

For relief printing this method is accurate. It is obvious to apply this method also to intaglio printing. Extensive color measurements on intaglio prints have however shown that the color-mixture laws in the case of intaglio printing are different from those in the case of relief printing and have proven difficulty accessible to analysis. This is due to the fact that the action of the color mixing in case of intaglio printing which is partly of an additive nature but predominantly of subtractive nature depends on a large number of factors which are difficult to take into consideration.

The application of the method described above for relief printing to intaglio printing leads to a first rough approximation which is unsatisfactory with respect to the color reproduction of the four-color separation.

In accordance with the invention, the three color components are first of all compared with each other, picture point by picture point and the smallest component which supplies, unchanged, the black component of the four-color separation, is thereupon subtracted, from the two other color components and the two remaining color components are increased as a monotonic function of the smallest color components with the increase in the slope, these increased residual color components giving the two color components of the four-color separation which corresponds to their color. This operation can be employed successfully not only intaglio printing but also in all other multicolor printing processes which use subtractive color mixing in whole or predominantly.

In accordance with a further feature of the invention, the above described operations are carried out by means of an electric circuit arrangement comprising three identical electric amplifier channels to the inputs of which there are fed the color components of the individual picture points of the three-color separation converted into electric voltages and from the outputs of which are taken the corresponding converted color voltages of the four-color separation each consisting of a series connection of a suppressor circuit and of a regulating amplifier and furthermore three identical control channels each of which controls a separate amplifier channel and a series connection of a circuit for the selection of the smaller of two different voltages and a distortion circuit, the output of the selector circuit being connected with the control input of the suppressor circuit and the output of the distortion circuit being connected with the regulating input of the regulating amplifier of the corresponding amplifier channel, and the double inputs of each control channel being connected with the inputs of that one of the two amplifier channels which do not belong to it, and finally comprising another selector circuit the two inputs of which are connected with the outputs of any two of the three selector circuits of the controls channels, the black voltage of the four-color separation being taken from its output.

By color components there is understood here the following:

It is assumed that from a color copy there have been produced by photography, with the interposition of suitable color filters, three black-white separations, namely a yellow separation, a red separation and a blue separation, in the form of transparencies, as is customary in the reproduction art. A physical measure of the size of the corresponding color component of a picture point is the "relative absorption" of the picture point of the corresponding transparency, that is, the ratio of the absorbed light to the incident light. The "relative absorptions" are indicated in percentages.

However, for the following discussion, the "relative absorptions" of the picture points of the three color separation transparencies need not be the initial values; they can also be converted to other values by a preceding color-correction process. In particular, the color components can be converted, for instance by photoelectric scanning of the three transparencies, into those proportional voltages which have been converted, for color correction, by electronic means into other voltage values.

The accompanying drawings shown the invention. In these drawings,

Fig. 1 shows in the form of a graph three color components of a three-color separation;

Fig. 2 shows in the form of a graph the construction of the enlargement function of the residual color components;

Fig. 4 shows in the form of a graph the three color components of the four-color separation;

Figure 5:
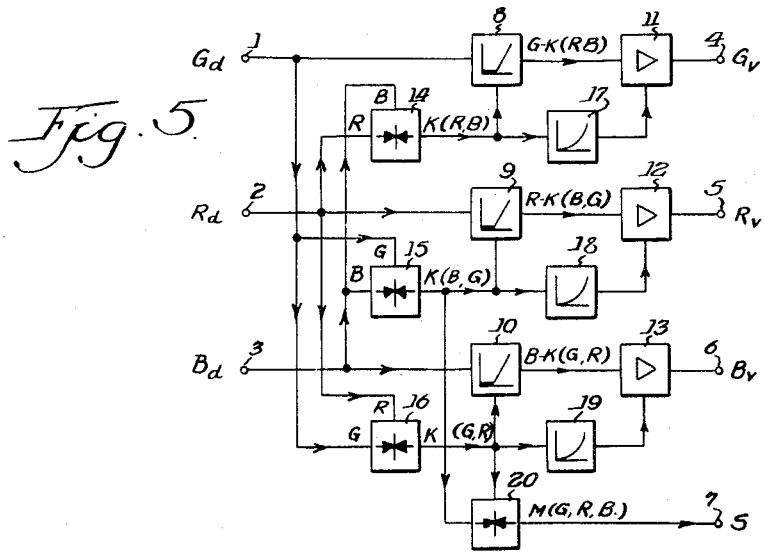
Figure 6:
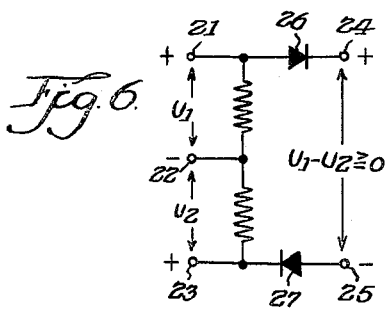
Figure 7:
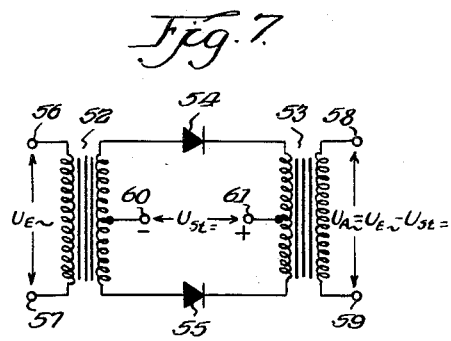
Figure 8:
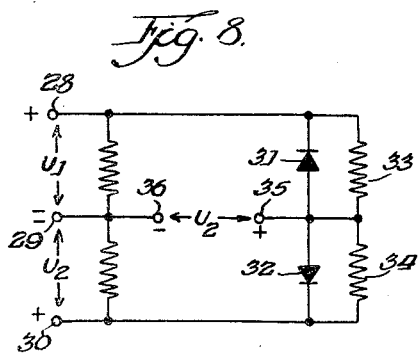
Figure 9:
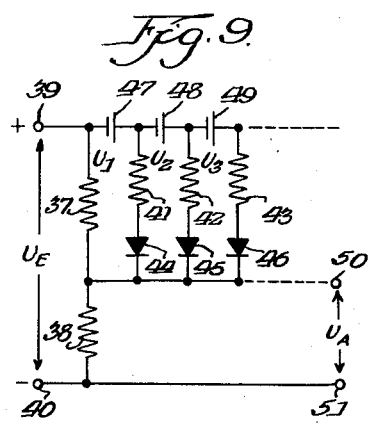
Figure 10:
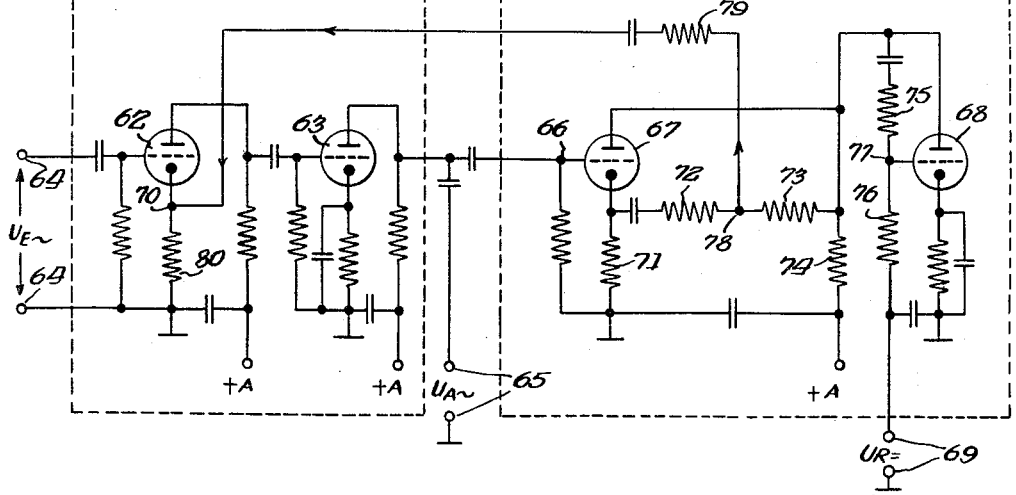

In Fig. 5 there is shown a circuit arrangement for the conversion;

Fig. 6 shows a circuit arrangement for the subtraction of two direct voltages;

Fig. 7 shows a circuit arrangement for the suppression of an alternating voltage by a direct voltage;

Fig. 8 shows a circuit arrangement for selection of the smaller of two voltages which are offered;

Fig. 9 shows a distorter circuit for producing a non-linear dependence between two voltages; and Fig. 10 shows the circuit arrangement of a regulating-amplifier.

The theory of the conversion process will first be discussed in detail with reference to Figs. 1 to 4.

In the diagram of Fig. 1 the relative absorptions of the individual colors of the three-color separation of a colored picture point which are to be converted are shown alongside of each other in accordance with their size and marked $G_d$, $R_d$, $B_d$, the subscript $d$ indicating that there are concerned the color values of the three color separation. In the case of the example it is assumed that we have $G_d > R_d > B_d$. $B_d$ has the smallest value, which is used, unchanged, to prepare the black separation of the four-color separation. Its relative absorption may be designated S. We then have $S = B_d$. The smallest color component $B_d$ is subtracted from the two larger ones $G_d$ and $R_d$ and supplies the two residual color components $G_d - B_d > 0$ and $R_d - B_d > 0$. For relief printing, we would have $G_v = G_d - B_d$, $R_v = R_d - B_d$, $B_v = 0$ and $S = B_d$, in which the subscript $v$ refers to the corresponding color components of the four-color separation, the exact converted values of the four-color separation. Not so, however, in the case of intaglio printing where these values represent merely a first rough approximation which would not give any satisfactory color effect upon the printing of the colors over each other. In intaglio printing, the differences $G_d - B_d$ and $R_d - B_d$ must be increased as a monotonic increasing function of the smallest color component $B_d$ in order to obtain the correct color values of the four-color separation. If the smallest of the three color components G, R, B is designated M (G, R, B,) we then have $G_v = V \cdot (G_d - M)$, $R_v = V(R_d - M)$, $B_v = V \cdot (B_d - M)$, $S = M$, or in general $$F_v = V \cdot (F_d - M) \qquad F_d = G_d, R_d, B_d$$
$$S = M \qquad F_v = G_v, R_v, B_v$$

in which $V = f(M)$ is an enlargement function with the above indicated properties and in which at least one of the three color components $G_v$, $R_v$, $B_v$ disappears for each picture point, namely, that one for which $F_d = M$. From color-measurement studies on intaglio prints, it has been found that the following enlargement function, which is obtained in accordance with the construction shown in the diagram of Fig. 2 gives a second, good approximation, sufficient in all cases for the color components of the four-color separation.

In the diagram of Fig. 2, the percentage of relative absorptions $F_d$ of the color components of the three color separation are plotted horizontally while the converted percentage of relative absorptions $F_v$ of the color components of the four-color separation are plotted vertically. From the point having the coordinates (1, 1), there are drawn a series of radiating linear enlargement characteristic lines to the horizontal axis. The point of intersection of the enlargement lines can also lie somewhat to the right or the upper right or lower right of the selected points (1, 1). The selection of the junction point depends empirically on the type of printing paper selected as well as on the printing colors selected. The lines have a different slope varying between 1:1 and 1:10. The smallest color component, in the case taken by way of example $B_d = 0.5$, determines the enlargement line, in the case taken by way of example the one having the slope of 1:2. The yellow component which is to be converted, in the example chosen $G_d = 0.8$, is greater than the (smallest) blue component $B_d$ by the amount $G_d - B_d = 0.3$. If at point $G_d = 0.8$ a line perpendicular to the horizontal axis is drawn, this line intersects the corresponding enlargement line having the slope of 1:2 at a point to which there corresponds the value $G_v = 0.6$ for the converted yellow component. The converted red component $R_v$ is determined similarly. The color component $R_d$ in the case taken as example is greater than the (smallest) blue component $B_d$ by the amount $R_d - B_d = 0.2$. If at the point $R_d = 0.7$ a line perpendicular to the horizontal axis is drawn, it intersects the corresponding enlargement line having a slope of 1:2 at a second point to which there corresponds the value $R_v = 0.4$ for the converted red component. The converted blue component $B_v$ is equal to zero, since $B_d$ is the smallest of the three color components of the three-color separation and therefore does not supply any contribution to the color components of the four-color separation. It gives, without change, the black component $S = B_d$.

Figure 3:
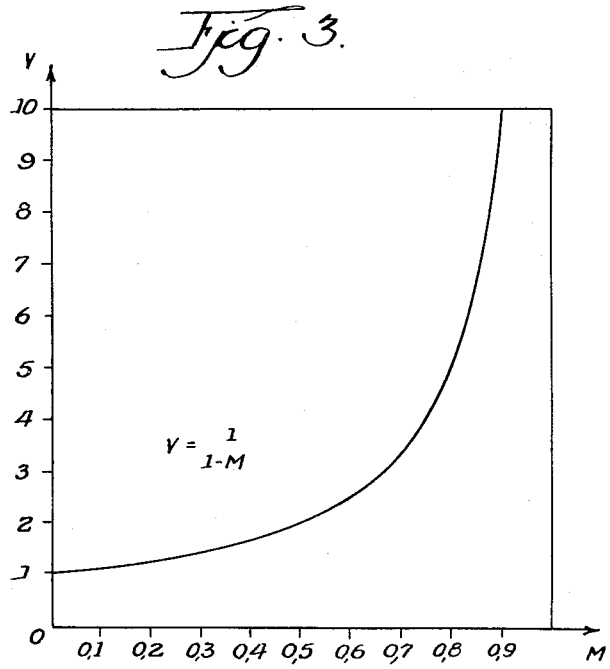
Fig. 3 is a graph of the enlargement function.

Analytically the functional dependence of the enlargement V thus constructed is shown as a function of the smallest color component M by the function $$V = \frac{1}{1 - M}$$

the graph of which is shown in Fig. 3 and which represents a branch of a rectangular hyperbola having the asymptotes $M = 1$ and $V = 1$. If this expression for V is inserted in the formulas obtained above for the color components of the four-color separation, there are obtained the converted color components $F_v = G_v$, $R_v$, $B_v$ as functions of the color components to be converted $F_d = G_d$, $R_d$, $B_d$ by the functions $$G_v = \frac{G_d - M}{1 - M}, \quad R_v = \frac{R_d - M}{1 - M}, \quad B_v = \frac{B_d - M}{1 - M}, \quad S = M$$

or in general $$F_v = \frac{F_d - M}{1 - M}, \quad S = M$$

of which, for each picture point, with the exception of the black component S, at least one disappears, namely the one for which $F_d = M$. For each trio of color components $G_d$, $R_d$, $B_d$ of the three-color separation of a picture point there are in each case two color components of the four-color separation and a black component, in which connection the color composition can change from point to point.

The result of the conversion is shown in the diagram in Fig. 4 in which the differences $G_d - B_d$ and $R_d - B_d$ enlarged twice in the case of the example are plotted alongside of each other as color components $G_v$ and $R_v$.

There still remain for discussion the two cases in which two or three respectively of the color components to be converted $G_d$, $R_d$, $B_d$ are equal to each other.

(1) In the first case it is assumed that $G_d = R_d$ approximately. In this case one must distinguish between the two subcases, $G_d = R_d \gtreqless B_d$.

(a) $\qquad G_d = R_d > B_d$

The smallest of the three color components is $B_d$ which is used unchanged as black component of the four-color separation. In accordance with the conversion formulas there are obtained for the color components of the four-color separation $$G_v = R_v \neq 0, \quad B_v = 0, \quad S = B_d$$

that is, the yellow and red components of the four-color separation are also similar to each other and the blue component disappears.

(b) $\qquad G_d = R_d < B_d$

The smallest of the color components is $G_d = R_d$ which gives, unenlarged, the black component $S = G_d = R_d$ of the four-color separation. In accordance with the conversion formulas there are obtained for the color components of the four-color separation $$G_v = R_v = 0, \; B_v \neq 0, \; S = G_d = R_d$$

The yellow and red components are again equal to each other, namely equal to zero, while the blue component differs from zero. The four-color separation therefore contains only one blue component outside of the black component.

(2) $\qquad G_d = R_d = B_d$

In this case there is no smallest color component. The superimposition of the three equal components in the three-color separation gives black; in other words, there is concerned no color picture point. The four-color separation accordingly contains no color component and its black component is $S = G_d = R_d = B_d$.

In Figs. 5 to 10 there are shown some circuit arrangements for carrying out the conversion.

Fig. 5 shows, in the form of a block diagram, the fundamental electric circuit arrangement for effecting the calculation operations of the above explained conversion operation. The realizing of this circuit in practice represents an electronic analogy calculating machine. It is assumed in this connection that the relative absorptions of the three colors of the three-color separation have been converted in some manner, for instance by means of photoelectric scanning, into electrical voltages which are proportional to the relative absorptions. For the sake of simplicity, these (percentual) voltages are again designated $G_d$, $R_d$, $B_d$; $G_v$, $R_v$, $B_v$; S. The color voltages can be direct voltages or alternating voltages. In the practical embodiment, the latter, in connection with which the picture content is modulated onto a carrier frequency voltage, are to be preferred since alternating voltages can be handled better from the standpoint of amplifier technique. The voltages of the control channels are direct voltages which are obtained if necessary by rectification of the color alternating voltages.

The circuit comprises three similarly constructed amplifier channels 8, 11; 9, 12 and 10, 13, to the inputs 1, 2, 3 of which there are fed the color voltages $G_d$, $R_d$, $B_d$, to be converted to the three-color separation and from the outputs 4, 5, 6, 7 of which there are taken the converted color voltages $G_v$, $R_v$, $B_v$, S of the four-color separation for further use. The amplifier channel comprises in each case a series connection of the suppressor circuit indicated separately at 8, 9, 10, such suppressor circuits being controllable with respect to their threshold value, and a regulating amplifier respectively indicated at 11, 12, 13. Furthermore, there are provided three control channels 14, 17; 15, 18 and 16, 19, each of which influences a separate amplifier channel, the control channels 14, 17 controlling amplifier channel 8, 11; 15, 18 controlling channel 9, 12; and control channel 16, 19 controlling channel 10, 13. The control channels comprise in each case a series connection of the selection circuit indicated separately at 14, 15, 16 and a distorter indicated separately at 17, 18, 19. The output of the selection circuits 14, 15, 16 of the control channels is in each case connected with the control input of the respective suppressor circuit 8, 9, 10, and the distorters 17, 18, 19 are respectively connected with the variable inputs of the regulating amplifiers 11, 12, 13 of the corresponding amplifier channels. The double inputs of the control channels are in each case connected with the inputs of those two amplifier channels which do not belong to the control channel in question. 20 is another selector circuit the two inputs of which are connected to the outputs of the two selector circuits 15 and 16 and the output 7 of which supplies the black voltage S of the four-color separation.

The circuit operates in the following manner:

The example again assumes the three-color input voltages $G_d > R_d > B_d$. To the input 1 of the first amplifier channel 8, 11, the "yellow channel," there is fed the yellow voltage $G_d$, the suppressor circuit 8 suppressing or subtracting from $G_d$ that amount of voltage which is fed to 8 through 14. The threshold value of 8 is controlled by 14. In the selection circuit 14 of the corresponding control channel 14, 17 there is selected from the other two voltages fed $R_d$ and $B_d$ the smaller voltage which may be designated by the symbol $K(R_d, B_d)$ and in the case of the example therefore $B_d$. The suppressor circuit 8 permits the passage only of the amount of $G_d$ which exceeds $B_d$ and therefore the difference $G_d - B_d$, provided this difference is positive. If it is zero or negative, the output voltage of 8 is equal to zero. The difference voltage $G_d - B_d$ is fed to the regulating amplifier 11 which may be a direct current or an alternating current amplifier. The regulating amplifier is a linear amplifier with variable feedback, the amplification factor of which is controlled as a function of the output voltage of the distorter 17. The smaller of the two voltages $R_d$ and $B_d$, in the case of the example $B_d$, is fed to the input of the distorter 17 which distorts $B_d$ in accordance with Fig. 3. Accordingly, the slope of the characteristic of 11 will be controlled as a function of the smaller color component $B_d$ in accordance with the indicated functional dependence. The output voltage $G_v$ of the amplifier is the yellow voltage of the four-color separation.

The red voltage $R_d$ of the three-color separation is fed to the input 2 of the second amplifier channel 9, 12 the "red channel." At 15 there is selected the smaller of the two other color voltages $B_d$ and $G_d$, in the case of the example again $B_d$ and $B_d$, which is subtracted from $R_d$ in 9. The difference voltage $R_d - B_d$ is amplified in 12, the amplification V being controlled by 18 as a function of $B_d$. The output voltage $R_v$ is the red voltage $R_v$ of the four-color separation.

Finally, the blue voltage $B_d$ of the three color separation which is to be converted is fed to the input 3 of the third amplifier channel 10, 13, the "blue channel." At 16, the smaller of the two other color voltages is selected which in the case of the example is $R_d$ and supplies the threshold value for 10. Since however the difference $B_d - R_d$ is negative in this case, 10 does not permit any voltage to pass through and the input voltage for 13 is zero. The output voltage $B_v$ of 13 is, therefore, also zero; in other words, no blue component is present in the four color separation in the case of the example. For each picture point of the four-color separation, there is absent however in all cases at least one of the three color components, in which connection the color types of the two color components can vary from point to point.

Since the three circuits 14, 15, 16 select in each case the smaller of the three possible color combinations (R, B), (B, G) and (G, R), the switch 20, the two inputs of which may be connected to any two of the three outputs of 14, 15, 16, necessarily selects the smallest M(G, R, B) from the three color voltages G, R, B, and therefore, in the case of the example $B_d$, which gives unchanged the black component $S = B_d$ of the four-color separation and is taken from the output 7 of 20.

An embodiment of the suppressor circuits 8, 9, 10 of Fig. 5 is shown in Fig. 6. The two voltages $U_1$ and $U_2$ which are to be subtracted from one another are connected in opposition at the input terminals 21, 22, 23. If $U_1 > U_2$, there appears at the output terminals 24, 25 the difference voltage $U_1 - U_2$ with the polarity indicated in the figure. If $U_1 = U_2$, the output voltage is equal to zero. If $U_1 - U_2 < 0$, the two rectifiers 26, 27, by the selection of their backward directions, bring it about that the output voltage is also zero.

Fig. 7 shows another embodiment for the suppressor circuits 8, 9, 10 according to Fig. 5 for the case that the voltage to be suppressed is an alternating voltage and the control voltage for the threshold value a direct voltage. 52 and 53 are transformers which are connected together via the rectifiers 54 and 55 in the manner of a push-pull modulator. The input alternating voltage $U_E$ which is to be made smaller is fed to the input terminals 56, 57 and the reduced (distorted) output alternating voltage $U_A$ is taken from the output terminals 58, 59. To the center taps 60, 61 of the two interconnected carrier windings, there is fed the control direct voltage $U_{St}$ which, depending on its magnitude, biases the two rectifiers 54 and 55 differently and thus weakens the input alternating voltage $U_E$ to a different extent. If the control voltage $U_{St}$ reaches or surpasses the amplitude of the input alternating voltage $U_E$, then $U_E$ will be completely suppressed and no alternating voltage will appear at the output.

Fig. 8 shows an example for the selector circuits 14, 15, 16 for Fig. 5. The two voltages $U_1 > U_2$ which are to be compared are connected in opposition to each other in two adjacent branches of a bridge circuit to the terminals 28, 29, 30 in the polarity indicated. The two other branches of the bridge include two rectifier tubes 31, 32 connected in push-pull, each of which is shunted by a resistor 33, 34 of large value as compared with the forward resistance of the rectifier tubes. These resistors serve to produce a definite potential at the point 35 where the tubes are connected together. Between the points 28 and 30 there is the potential difference $U_1 - U_2$ which is directed from 28 toward 30. The tube 31 remains blocked, while the tube 32 will become conductive and assumes a very small resistance. The voltage difference $U_1 - U_2$ drops now practically only over the resistor 33 so that between the bridge diagonal points 35 and 36 there is present the lower voltage $U_2$. If $U_1 = U_2$, and between the terminals 35 and 36 there will appear the voltage $U_1 = U_2$.

In Fig. 9 there is shown an example for the distorter circuits 17, 18, 19 of Fig. 5. The resistors 37 and 38 form a voltage divider to which the input voltage $U_E$ is fed at the terminals 39 and 40. Parallel to the resistor 37 there is any desired number—in the case of the example 3—of rectifier tubes 44, 45, 46, for instance diodes, provided with series resistors 41, 42, 43. From the voltage sources 47, 48, 49, each of the tubes 44, 45, 46 receives a different bias voltage $U_1$, $U_2$, $U_3$, each of which is higher than the preceding one but which do not have to have constant differences. The output voltage $U_A$ is obtained at the terminals 50 and 51 in accordance with the desired functional relationship. If the input voltage $U_E$ increases from a value of zero to the value of $U_1$, the partial voltage at the resistor 38 increases linearly from zero. If the bias voltage $U_1$ is exceeded, the tube 44 will pass current, its forward resistance drops to a very small value as compared with the series resistor 41 which extends in parallel to the resistor 37. As a result, the resistance of the parallel circuit is reduced and the output voltage $U_A$ at the terminals 50, 51 again increases linearly upon a further increase of the input voltage $U_E$, but this time more rapidly than previously. If upon the further increase of the input voltage the next higher bias voltage $U_2$ of the tube 45 is exceeded, such tube will pass current, its series resistor 42 being in parallel to 37 and 41. The resistance of the parallel circuit consequently is now lower and upon a further increase of the input voltage, the output will again increase linearly but this time with an even greater slope than before. The course of the output voltage as a function of the input voltage is represented by a series of lines the individual successive portions of which have a constantly increasing slope and show bends at the connection points. The series of lines shows a monotone increase, increasing at first slowly and then more rapidly and therefore has a rising tangent. If the input voltage drops from higher to lower values, the output voltage passes through the series of lines in the reverse direction from lower to higher values. In practice the bends of the curve are rounded off by the starting curves of the characteristics of the tube; furthermore, by increasing the number of tubes, a smooth curve course can be well approximated. By suitable selection of the biases and series resistances of the tubes as well as the number of tubes used, it is possible to obtain any desired prescribed increasing course of the voltage of the above mentioned type, particularly the hyperbolic course shown in Fig. 3.

In Fig. 10 there is shown a circuit of the regulating amplifiers 11, 12, 13 of Fig. 5. The degree of amplification is controlled by means of a variable negative feedback. The circuit arrangement with the tubes 62 and 63 represents a normal two-stage resistance-coupled amplifier to the input 64 of which there is fed the input alternating voltage $U_E$ to be amplified and from the output 65 of which there is taken the amplified output alternating voltage $U_A$. At 66 the output voltage is branched off and fed to the circuit arrangement containing the two tubes 67 and 68 to which is fed at 69 the control direct voltage $U_R$. The controlled negative feedback voltage is connected in series at 70 in opposite phase to the input voltage.

The circuit arrangement with the two tubes 67 and 68 represents essentially a bridge circuit with three resistors 71, 72, 73 and a fourth variable resistor, which is composed as follows:

68 is a pentode having the load resistance 74 and the voltage divider 75, 76 connected in parallel to it, the voltage divider being connected at 77 with the control grid of 68. The voltage divider resistance of 75 and 76 is very high as compared with the alternating current resistor 68 and the external resistance 74 of 68. At 69 the control voltage is fed, producing a change in the slope of 68, whereby the active resistance between the plate of 68 and ground can be varied within certain limits.

The tube 67 serves to produce at 71 and 74 two voltages which are 180° out of phase with each other. Between 68 and ground the negative feedback voltage is tapped off as the bridge diagonal voltage and fed via the voltage divider 79, 80 to the cathode 70 of 62.

The advantage of the bridge circuit is, that with a relatively small change in the control voltage, in order to avoid distortions of the control voltage in tube 68, a relatively large change of the bridge diagonal voltage, that is, the negative feedback voltage, can be obtained if by a suitable dimensioning of the bridge resistances the bridge is operated in the vicinity of the equilibrium state. The bridge is so balanced that upon a disappearing control voltage, it supplies the greatest negative feedback voltage, the amplification being the lowest. With an increase in the control voltage, the bridge diagonal voltage becomes lower, the bridge approaches the balanced state and the amplification increases.

The proposed circuits in accordance with Figures 6 to 10 represent merely illustrative examples and may be replaced in various ways by other arrangements which achieve the same purpose without thereby limiting the content or scope of the inventive features.

Changes may be made within the scope and spirit of the appended claims.

We claim:

1. Apparatus for converting three color separations, namely, yellow, red, blue, into four color separations, namely, yellow, red, blue, black, which are equivalent in the printing result for reproduction, utilizing subtractive color mixing at least predominantly, particularly for intaglio printing reproduction, comprising three equivalent electrical amplifier channels each comprising in series relationship a suppressor circuit and a regulating amplifier, means for feeding to the inputs of said amplifier channels the color components of individual picture points of the three color separation to be transformed into proportional electric voltages, representing the color voltages, three similar double input control channels each for controlling one of said amplifier channels and comprising a selection circuit having a series connection of a circuit for selection of the lower one of two offered voltages and a distorter circuit, means for connecting the output of the selection circuit with the control input of the suppressor circuit and the output of the distorter circuit with the control input of the regulating amplifier of the corresponding amplifier channel, means for connecting the double inputs of each control channel with the inputs of those two amplifier channels which do not belong to it, another selection circuit having a pair of inputs, and means for connecting the two inputs of said other selection circuit with the outputs of any two of the three selection circuits of the control channels, the outputs from said amplifier channels providing the respective transformed color voltages of the four color separation, and the output from said other selection circuit providing the black voltage of the four color separation.

2. Apparatus according to claim 1, wherein said selection circuit comprises means for operatively connecting the two offered voltages with two rectifier tubes, with the two voltages in opposition with each other and the two rectifier tubes connected in opposition to each other and each shunted by a resistor forming in each case two adjacent branches of an electric bridge circuit, the forward directions of the two tubes being directed opposite to the two voltages, and the smaller voltage being obtained as bridge diagonal voltage between the connecting point of the two voltages and the connecting point of the two tubes.

References Cited in the file of this patent
UNITED STATES PATENTS

| | | |
|---|---|---|
| 2,691,696 | Yule | Oct. 12, 1954 |
| 2,721,892 | Yule | Oct. 25, 1955 |
| 2,748,190 | Yule | May 29, 1956 |